United States Patent
Moll et al.

[11] Patent Number: 5,896,654
[45] Date of Patent: *Apr. 27, 1999

[54] METHOD AND APPARATUS FOR CONNECTING WINDING MATERIALS TO TERMINAL ELEMENTS

[75] Inventors: Helmut Moll, Erlangen-Tennenlohe; Peter Schöner, Amberg, both of Germany

[73] Assignee: Siemens aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/856,351

[22] Filed: May 14, 1997

Related U.S. Application Data

[63] Continuation of application No. 08/535,179, filed as application No. PCT/DE94/00331, Mar. 23, 1994, abandoned.

[30] Foreign Application Priority Data

Apr. 26, 1993 [DE] Germany ............... 43 13 608

[51] Int. Cl.⁶ .......... H01R 43/02; H01R 43/033
[52] U.S. Cl. .......... 29/860; 29/33 M; 29/564.4; 29/605; 242/439.1; 242/907
[58] Field of Search ............. 29/33 F, 33 M, 29/56, 605, 606, 564.4, 735, 748, 760, 857, 860, DIG. 42; 140/93 R; 242/439.1, 439.2, 439.3, 907

[56] References Cited

U.S. PATENT DOCUMENTS

| | | |
|---|---|---|
| 3,314,452 | 4/1967 | Cartwright et al. ......... 140/93 R X |
| 3,555,477 | 1/1971 | Hildebrandt ............ 29/605 |
| 3,759,454 | 9/1973 | Bernard ............ 242/439.1 |
| 4,251,911 | 2/1981 | Reynolds et al. ............ 29/605 |
| 4,687,898 | 8/1987 | Riordan et al. . |

FOREIGN PATENT DOCUMENTS

| | | |
|---|---|---|
| 0 200 014 | 12/1986 | European Pat. Off. . |
| 0193015 | 11/1982 | Japan ............ 29/605 |
| 2 166 005 | 4/1986 | United Kingdom . |

*Primary Examiner*—Peter Vo
*Attorney, Agent, or Firm*—Hill & Simpson

[57] ABSTRACT

In particular to connect wires insulated with highly heat-resistant lacquer to terminal elements, the winding wire has hitherto been wrapped around a terminal element and connected mechanically and electrically at at least one connection point by the local application of energy with the removal of the insulation. During winding around the terminal element, the winding end is held under pretension and simultaneously vibrations, in particular in the ultrasonic region, are coupled into the winding wire/terminal element system at the connection point to apply energy. Preferably, the vibrations are coupled into the wire outside the connection point. As a result of the fact that the vibrations propagate via the tensioned wire and bring about a relative movement between winding material and terminal element, an insulating layer can be broken up at least partially and the electrical connection to the terminal element is made by ultrasonic welding. For this purpose, an ultrasonic horn is assigned to the winding nozzle (10) for the transmission of, in particular, ultrasonic vibrations to the winding wire (5), preferably as part of the winding nozzle (10).

12 Claims, 2 Drawing Sheets

METHOD AND APPARATUS FOR CONNECTING WINDING MATERIALS TO TERMINAL ELEMENTS

This is a continuation of application Ser. No. 08/535,179, filed Oct. 24, 1995 now abandoned.

BACKGROUND OF THE INVENTION

The invention relates to a method for connecting winding materials to terminal elements, in particular for connecting wire ends insulated with highly heat-resistant lacquer to terminal pins, the winding material being wound around a terminal element and being connected to the terminal element mechanically and electrically at at least one connection point by the application of energy. In addition, the invention also relates to the associated device for carrying out the method using a winding device comprising wire-feed device and a winding nozzle.

A great variety of methods have hitherto been used in practice for connecting winding ends of winding materials, particularly of heat-resistant and highly heat-resistant lacquered wires: if the lacquer on the winding material end has been stripped, soldering or welding methods can advantageously be used. In this connection, both soft soldering and hard soldering are suitable as soldering methods, and for example, arc welding, electron-beam (EB) welding, resistance welding, laser welding or ultrasonic welding are suitable as welding methods. Since, however, the stripping of the lacquer implies an additional operation, efforts are being made, within the framework of an integrated manufacture, to achieve a connection without prior stripping. In the case of heat-resistant lacquered wires, on the one hand, a specific high-temperature soft soldering or, alternatively, the welding methods already mentioned are suitable for this purpose.

Because of the application of energy with comparatively high intensities necessary in this process, additional metallic elements such as, for example, sleeves, straps or cover plates normally have to be used as aids for this purpose. For ultrasonic welding, in particular, it is also already known from European reference EP-B-0 200 014 to weld, in a single method step, a wire to a connecting element by ultrasonic welding by breaking up the insulation layer and deforming the cross section, the connection region then immediately being enclosed with a drop of a fast-curing organic or inorganic adhesive.

The latter method is suitable, in particular, for thin lacquer-insulated wires if a planar terminal element is available and the energy can be applied in a localized manner. It is used, for example, to produce electronic components for the SMD technology. The known method is less suitable for connecting winding materials in the automated production of coils if winding material and/or terminal element perform rapid movements.

SUMMARY OF THE INVENTION

The object of the present invention is to provide a method with which winding materials can be connected at their winding ends for the purpose of the automated winding of coils comprising, for example, wires insulated with highly heat-resistant lacquer without stopping the automatic winding machine. The automated manufacturing method is therefore not to be additionally interrupted for a connecting operation, such as welding or the like, for which a suitable device has to be provided.

In a method of the type mentioned at the outset, the object is achieved, according to the invention, in that, during the winding around the terminal element, the winding end is held under pretension, in that vibrations, in particular in the ultrasonic range, are coupled into the winding material/terminal element system, and in that connections are formed by the friction between the winding material held under pretension and individual regions of the terminal element which touch the winding material.

In an advantageous implementation of the invention, the vibrations can be coupled into the winding material and/or the terminal element outside the connection points. Consequently, the vibrations are preferably applied to the winding material only during the winding operation around the terminal element. Since the vibrations propagate over the tensioned wire and bring about a relative movement between wire and terminal element, an insulating layer can be broken up at least partially and an electrical connection can consequently be made to the terminal element. In particular, a highly heat-resistant lacquer insulation can be processed in this way to make a connection point.

According to the invention, in a device suitable for carrying out the method, an ultrasonic horn is assigned to the winding nozzle for the transmission of, in particular, ultrasonic vibrations to the winding wire and is optionally a component of the winding nozzle. In this case, the winding nozzle for winding a coil or the like preferably performs predeterminable path movements. The winding material end is wrapped around the element to connect the winding material to a terminal element and the ultrasonic horn performs its path movement with the winding nozzle. In particular, the winding nozzle may itself be designed as an ultrasonic horn.

Additional elements, such as cover plates, straps, sleeves or the like are not needed within the framework of the invention. However, it may be advantageous to provide the connected terminal element with a mechanical protection following the method according to the invention, for which purpose lacquer, casting resin or soft solder is used.

On the one hand, the invention can advantageously be used in the integrated manufacture of coils. In this case, the coils are wound on automatic winding machines in which the winding material performs a translational movement in the axial and radial direction with respect to the terminal element. Whenever the winding ends are fastened, for example, the winding nozzle is excited with ultrasonic vibrations. Under these circumstances, surprisingly small deformations at edges or profiled sections of the terminal element are sufficient to achieve an adequate mechanical and electrical connection of wire and terminal element.

On the other hand, the invention can advantageously be used in winding axial components with insulated wire, the winding material preferably being conveyed translationally and the component having terminal elements performing both a rotational movement and a longitudinal movement. In this case, the ultrasound is coupled into the wire, in particular, in the connecting phase at the axial connections.

In both application cases, as an alternative to the external excitation of the wire with ultrasonic vibrations, the component or the terminal element may also be exposed.

Optionally, it is also possible to excite both the wire and the terminal element, and in this case, at least a phase shift in the vibrations must be ensured to guarantee the necessary relative movement. It is essential in all the application cases that, according to the invention, a remote action of the vibrations, in particular ultrasonic vibrations, is exploited.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
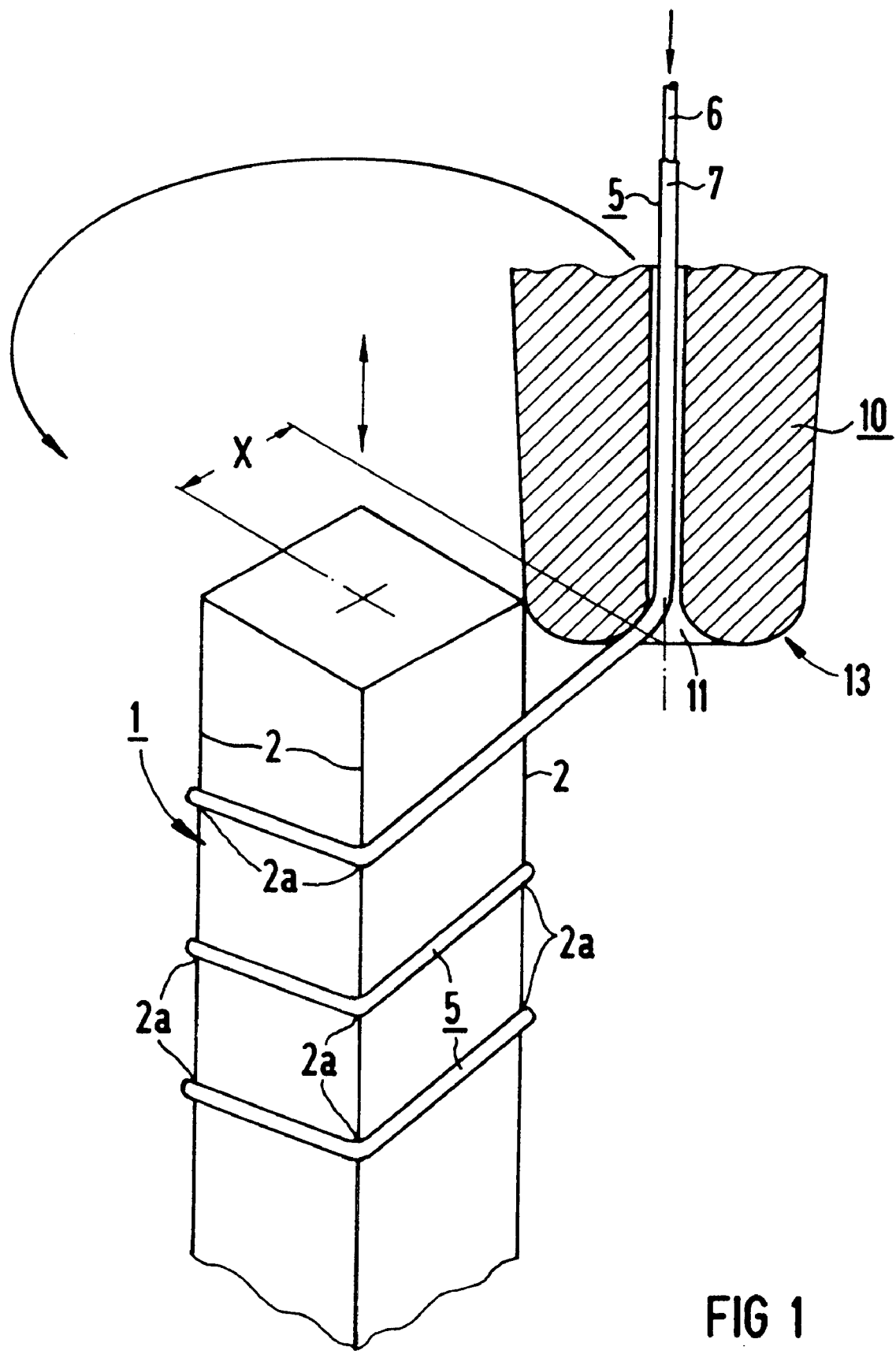
FIG. 1 shows the principle of the ultrasonically assisted winding of lacquer-insulated wires.

In FIG. 1, 1 denotes a terminal pin to which a winding wire 5 is to be attached in such a way that a sufficiently reliable, mechanical and electrical connection is formed. The terminal pin 1 consists of a metallic material and preferably has a rectangular cross section with edges 2. With a further terminal pin, it is, for example, a component of a coil to be wound automatically onto a coil core. For this purpose, the winding wire 5 must be electrically insulated, that is, it is composed of a metallic core 6 with an insulating sleeve 7, which is normally formed by a lacquer layer composed of highly heat-resistant material.

Such coils are wound automatically on commercial automatic winding machines at high speed, only the connecting hitherto having been carried out as a separate working step which is comparatively time-consuming. To manufacture the coils, a winding nozzle is known to be present which, in the case of automatic winding machines, is part of a so-called wire guide which can perform pre-programmable movements to wind the coil, on the one hand, and to attach the winding wire to the terminal elements.

In FIG. 1, a winding nozzle 10 is indicated which has a central hollow channel 11 and a rounded functional end 13. The winding wire 5, for example a lacquer-insulated copper wire, passes through the hollow channel 11 of the winding nozzle 10. The winding nozzle 10 and/or the component having the terminal pin 1 can be excited with ultrasound. In particular, however, an ultrasonic transducer, which is not shown in detail and which excites the entire winding nozzle 10 with vibrations of a specified amplitude in the direction of the double arrow is assigned to the winding nozzle 10.

If a distance x is present as functional dimension between terminal pin 1 and winding nozzle 10 including ultrasonic horn and the winding wire 5 is under pretension, vibrations which form standing waves can be transmitted via the tensioned wire 5. As a result of suitable dimensioning, the result can be achieved that the amplitude maximum is situated at the respective edge of the terminal element 1 which is designed as a rectangular pin.

As a result of the remote action of the ultrasound, a relative movement is produced between the wire 5 and the individual edges 2 of the terminal pin 1. Because of said relative movement, the lacquer on the wire 5 is broken up at the contact point with the edges 2. Connections 2a can consequently be formed at the edges 2 of the terminal pin 1 as a result of welding action.

Experiments have revealed that certain deformations occur at the edges 2 of the terminal pin 1. This results in a sufficiently reliable material connection which achieves the electrical connection. Optionally, to further protect the wound terminal pin 1 mechanically, lacquer, casting resin or soft solder can be applied in a subsequent working step. The latter is carried out, however, after the actual electrical connecting has already taken place.

Figure 2:
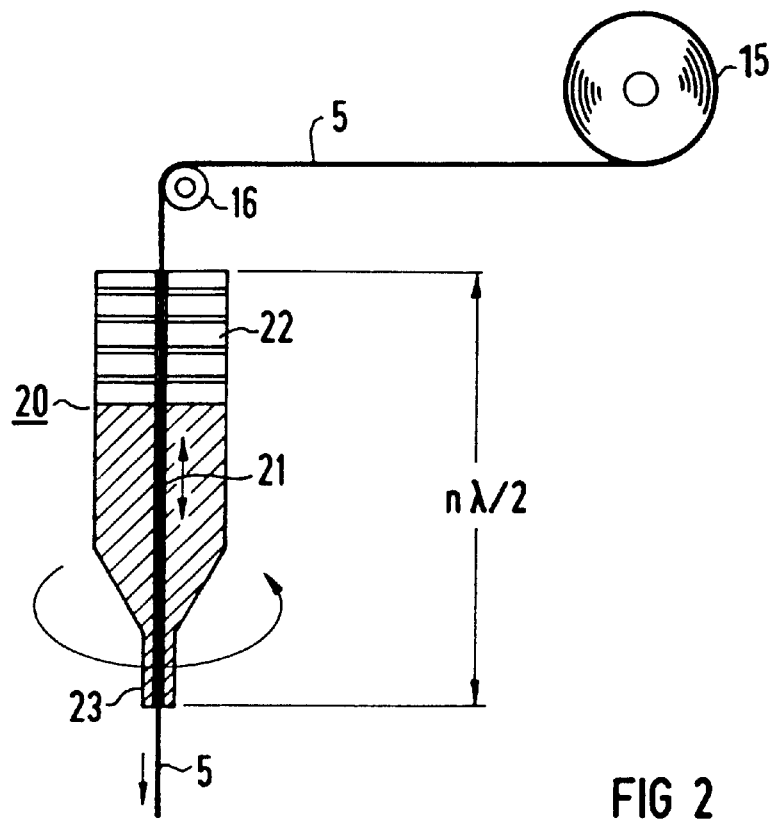
FIG. 2 shows an ultrasonic horn designed for use in FIG. 1.

In FIG. 2, the winding nozzle according to FIG. 1 is given a specific form: from a winding-wire stock 15, the winding wire 5 runs via a roller as deflection device 16 centrally through an ultrasonic horn 20 designed as winding nozzle. The ultrasonic horn has a coaxial channel 21 and is provided with a vibration transducer 22 in its rear part. The geometry of the entire winding nozzle 20, including vibration transducer 22 and the front part 23 designed as horn, is designed as a multiple of $\lambda/2$ so that it is in resonance.

As the wire 5 passes through the vibration transducer 22 and the guide channel 21, adjacent thereto, of the winding nozzle, longitudinal vibrations whose amplitude is set by the horn 23 can be applied to the wire 5. As a result of the compact construction, the ultrasonic horn, which is constructed as winding nozzle 20, is able to perform translational and rotational movements to an equal extent, as is known from the wire guide of the automatic winding machine.

A particular advantage of the winding nozzle 20 shown in FIG. 2 and excited with ultrasound is that a cleaning effect for deposits due to lacquer abrasion and lubricant in the nozzle channel 21 is achieved by the vibrations.

In FIG. 2, the winding wire 5 is conveyed centrally in the nozzle channel 21. Arrangements are also possible in which the wire 5 enters the winding nozzle at an angle. As a result, a running direction of the wire 5 can be set which is transverse to the direction of vibration of the ultrasound, which is advantageous for certain applications.

Figure 3:
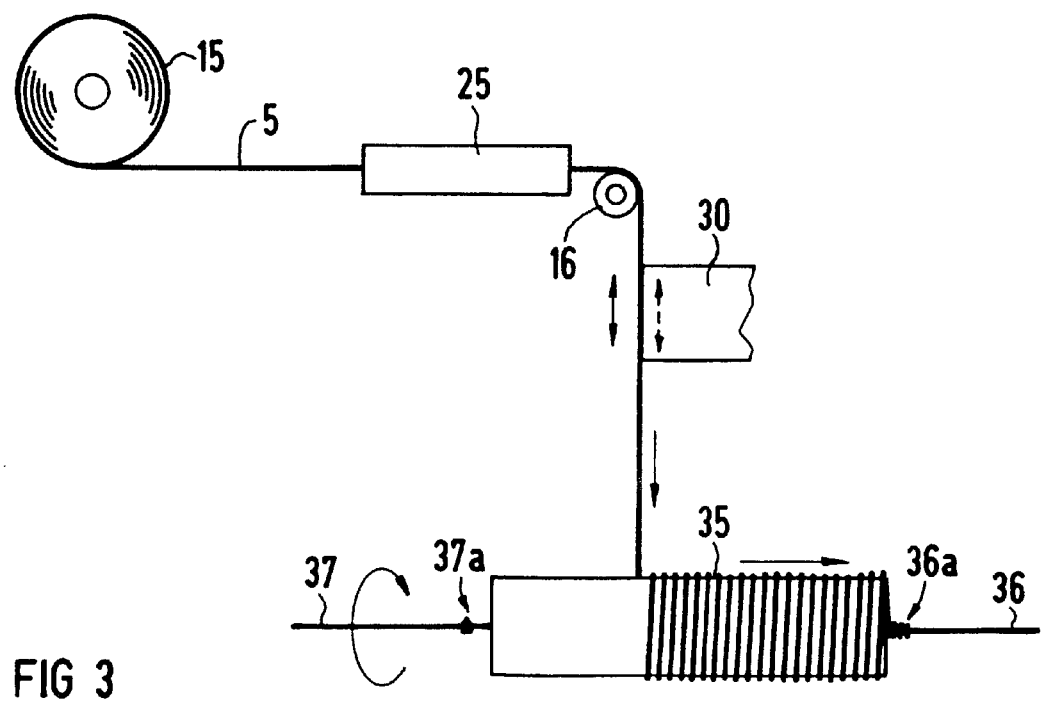
FIG. 3 shows a device with separate ultrasonic horn.

In FIG. 3, the wire 5 is conveyed from a winding stock 15 through a known winding nozzle 25 and deflected over a roller 16 assigned to the winding nozzle 25 in order to wind an axial component 35 having terminals 36 and 37. In this case, a separate ultrasonic horn 30 past which the wire 5 runs in order to couple in the vibrations is present between winding nozzle 25 and component 35. In such an arrangement, it is advantageous to convey the wire only translationally, but to allow the component 35 itself having the axial terminals 35 and 37 to perform both a rotational movement and a longitudinal movement. During the phase of wrapping the terminals 36 and 37 with the wire 5, the ultrasonic horn 30 is activated and vibrations are transmitted via the wire 5. As a result of the relative movement between wire 5 and terminal 36 or 37 with surface roughnesses present, connections 36a and 37a are consequently formed after abrasion of the insulation.

In the exemplary embodiments described, it is assumed that the terminal elements have been chosen as pins or tongues having rectangular cross section, and the edges define the connection points. It is also possible to use terminal elements of another geometry in which the surfaces are roughened or profiled in a suitable manner in order to form certain regions as connection points.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for connecting winding materials to terminal elements, winding material being wound around a terminal element and connected mechanically and electrically to the terminal element at at least one connection point by the application of energy, comprising the steps of:

providing a winding material having a first end portion contacting individual regions of the terminal element, the winding material and the terminal element forming a winding material/terminal element system, the winding material having an electrically insulating cover;

winding the winding material around the terminal element;

holding, during the winding around the terminal element, the second end portion of the winding material under pretension;

coupling vibrations into the winding material/terminal element system thereby removing the insulating cover of the winding material at the contacting regions of the terminal element, and thereby forming connections between the first end portion of the winding material held under pretension and the individual regions of the terminal element which touch the winding material.

2. The method as claimed in claim 1, wherein the method further comprises effecting translational movements of the winding material in an axial direction and in a radial direction with respect to the terminal element.

3. The method as claimed in claim 1, wherein the method further comprises conveying the winding material translationally and performing both a rotational movement and a longitudinal movement on the terminal element.

4. The method as claimed in claim 1, wherein the terminal element has polygonal cross section with an individual edge as the connection point.

5. The method as claimed claim 1, wherein the terminal element has a roughened or profiled surface with an individual region as the connection point.

6. The method as claimed in claim 1, wherein the method further comprises providing the terminal element with a mechanical protection.

7. The method as claimed in claim 6, wherein the mechanical protection is one of lacquer, casting resin and soft solder.

8. The method as claimed in claim 1, wherein the winding material is a wire having a highly heat-resistant lacquer coating.

9. A device for connecting winding materials to terminal elements, the winding material being wound around a terminal element and connected mechanically and electrically to the terminal element at at least one connection point by the application of energy, the winding material having an electrically insulating cover, comprising:

a winding device having a wire-feed device for supplying the winding material and having a winding nozzle for dispensing the winding material onto the terminal element; and an ultrasonic horn mechanically connected to the winding nozzle for transmitting ultrasonic vibrations to the winding material, the ultrasonic horn and the winding nozzle forming a guide for the winding material;

wherein the ultrasonic vibrations in an ultrasonic range are coupled into the winding material via the winding nozzle, thereby removing the insulating cover of the winding material in a region of the connection point and thereby effecting an electrical connection between the winding material without the insulating covering and the terminal element, and wherein the winding nozzle performs predetermined path movements and wraps the winding material end around the terminal element to connect the winding material to the terminal element.

10. The device as claimed in claim 9, wherein the winding material is conveyed centrally in the winding nozzle which is connected to the ultrasonic horn.

11. The device as claimed in claim 9, wherein the winding material enters or leaves the winding nozzle, which is connected to the ultrasonic horn, obliquely at a specified angle.

12. A device for connecting winding materials to terminal elements, the winding material being wound around a terminal element and connected mechanically and electrically to the terminal element at at least one connection point by the application of energy, the winding material having an electrically insulating cover, comprising:

a winding device having a wire-feed device for supplying the winding material and having a winding nozzle for dispensing the winding material onto the terminal element; and an ultrasonic horn coupled to the winding nozzle for transmitting ultrasonic vibrations to the winding material, the ultrasonic horn being rigidly located between the winding nozzle and the terminal element;

wherein the ultrasonic vibrations in an ultrasonic range are coupled into the winding material via the winding nozzle, thereby removing the insulating cover of the winding material in a region of the connection point and thereby effecting an electrical connection between the winding material without the insulating covering and the terminal element and wherein the winding material moves contiguously past the ultrasonic horn for the application of the vibrations.

* * * * *